June 12, 1945.  P. P. HORNI  2,378,014
METHOD OF DETERMINING THE EFFECTIVE RANGE OF MAGNETIC DETECTORS
Filed March 24, 1942  2 Sheets-Sheet 2

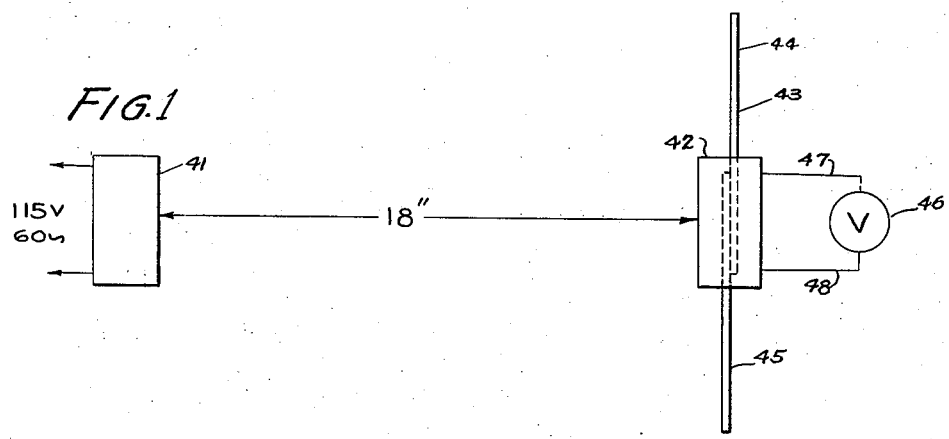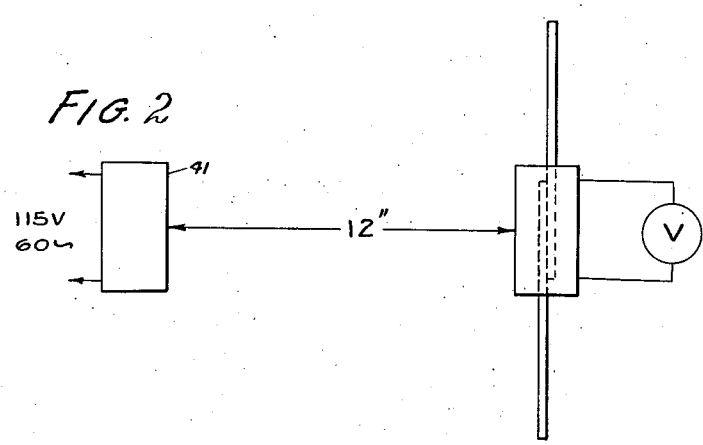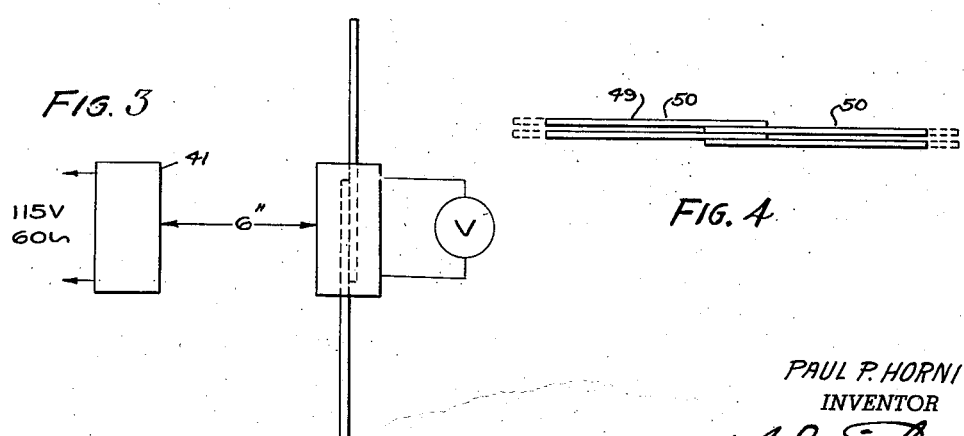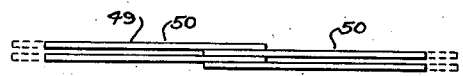

PAUL P. HORNI
INVENTOR
ATTORNEY

Patented June 12, 1945

2,378,014

UNITED STATES PATENT OFFICE 2,378,014

METHOD OF DETERMINING THE EFFECTIVE RANGE OF MAGNETIC DETECTORS

Paul P. Horni, Newark, N. J.

Application March 24, 1942, Serial No. 435,922

4 Claims. (Cl. 29—155.5)

Fundamentally, the invention pertains to a vehicle actuable device which utilizes a magnetic detector, which detector is energized by the passage of a vehicle to operate an electro-sensitive element which in turn initiates operation of a control apparatus. The control apparatus may be of varying types such as a traffic controller for energizing traffic signals at an intersection of a street.

The device may also be used for permitting a vehicle to initiate operation of a mechanism to detonate an explosive charge for destruction and demolition of a vehicle, such as a tank. The device also may be used for demolition of bridges and other structures over which tanks and other mechanized units may seek to traverse.

Heretofore, when employing devices which are actuable by a detector of the magnetic type, various techniques have been used in fabricating the magnetic detector. One of the types of magnetic detectors consists primarily of a coil of wire wrapped about a core of magnetizable material, the core and the coil of wire having certain characteristics so that it will operate under given conditions. Ordinarily the core is of a length which has been determined by the cut and try method. The length of the core being usually sufficient to produce satisfactory operation with the particular equipment with which it is used.

The present invention contemplates a core which is variable in length so that the length of said core may be varied to produce different degrees of sensitivity, for example, with a specified type of electro-sensitive element and control apparatus the length of the core of the detector may be varied so that the apparatus will operate efficiently at a given distance, let us say 2 ft., and the length of the core may then be varied so that the same vehicle will actuate the apparatus at a distance of let us say 10 ft.

It will therefore be seen that the present invention may be used to vary the efficiency and effectiveness of a magnetic detector by varying the length of the core. This becomes extremely essential in magnetically actuable detecting equipment such as may be used for military purposes.

With certain types of magnetically actuable equipment for military purposes the detector may be so adjusted that the ordinary tank must be within 2 ft. of the detector in order to generate sufficient voltage to actuate the detector and its equipment responsive thereto. The present invention may utilize this same equipment but with a longer core so that a vehicle would detonate a mine at 10 ft. or 12 ft. or even greater distances, provided the charge of the main explosive is sufficient to accomplish the desired demolition objective.

It is common practice in signaling systems, particularly those systems relating to the control of traffic of a vehicular type, namely, automobiles and the like, to employ what is commonly referred to as detectors. The detectors are generally classified as either mechanical or magnetic. In the mechanical type of detector, the vehicle must actually engage a contactor which is located in the street, in the path of the vehicle. As the vehicle engages the contactor, an electrical circuit is completed, which causes certain apparatus to function, which, through a series of operations, eventually causes a traffic signal to be operated. In the magnetic type of detector, a device is placed in the street in the vicinity of the path of the vehicle to be detected, said detector being actuated by the passage thereover or thereabouts, due to the presence of a mass of magnetizable material, the vehicle, per se, not physically engaging or pressing any tangible element. While it is old in the art to use a coil with a simple core as a magnetic detector, this is, perhaps, one of the simplest forms of magnetic detector.

It is further pointed out that while there have been magnetic detectors which were usable to give certain results for the control of signaling apparatus, there are many cases where the vehicle itself carried a permanent magnet for the purpose of generating a current in a sensitive instrument, due to the cutting of the magnetic field by conductors of the coil of said magnetic detector. To provide a detector which requires this type of permanent magnet installation on a vehicle, is definitely costly in itself, and further undesirable, due to the installation charges.

A great deal of experimentation and scientific research has disclosed that all vehicles are fundamentally and inherently magnetized. This may be due to many causes, such as the aligning of the parts of the metal used in construction to form resultant magnetic poles, or partly due to the formation of a number of independent magnets. It is well known that a ship will take on a given polarity, due to the position in which it rests when actual construction has taken place. From many causes a vehicle, therefore, is a huge magnet, or a multiplicity of magnets. Tests indicate that a front and rear bumper of an automobile may each be independent magnets and that the vehicle itself will have many opposing polarities, which may be manifested by moving a compass in the vicinity of various parts of the vehicle. Regardless of the peculiar polarities of various vehicles, it is nevertheless established by tests that the vehicle in itself does possess enough magnetic material to produce magnetizing lines of force emanating therefrom to cause a current to flow or a voltage to be set up in a detector of the type herein employed.

It is an object of the present invention to provide a novel method and means of increasing the efficiency of a magnetic detector and vehicle actuable detector system utilizing said detector.

It is a further object of the invention to provide a method of determining the maximum efficiency of a magnetic detector by varying the length of the core of the detector.

It is a further object of the invention to provide a novel method of determining the maximum efficiency of a magnetic detector by establishing the length of the core in relation to a given coil or range of coil lengths.

Other and further objects may be and may become apparent to one skilled in the art from a perusal of the drawings and specifications presented herewith and the present disclosure is not to be considered as a limitation since it is illustrative of only certain embodiments of the invention.

The magnetic detector and signalling system therefor disclosed in this application are claimed in my application Serial Number 478,850, filed March 11, 1943.

In the drawings:

Figs. 1, 2 and 3 are schematic representations of a method of determining the efficiency of the magnetic detector as controlled by the length of the core.

Fig. 4 is an arrangement of the core laminations per se being shown dotted indicating the elongation of the overall core.

Figure 6:
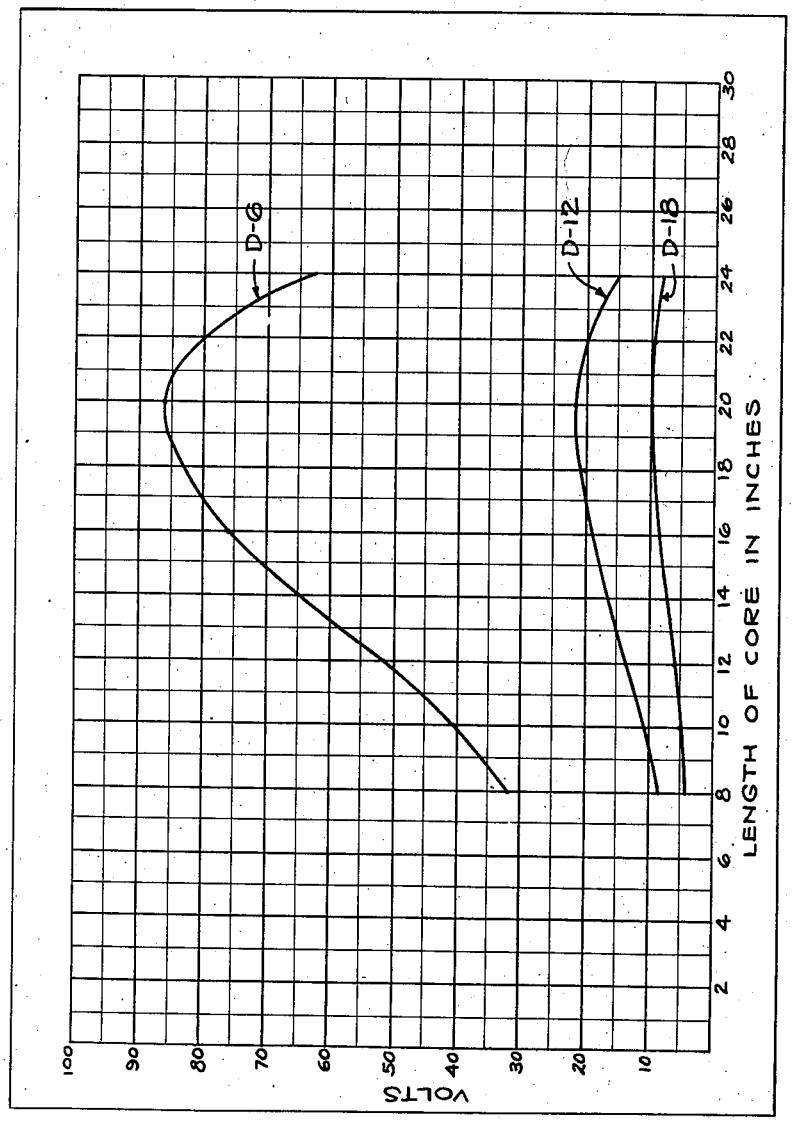
Fig. 6 is a graph showing the various values of voltage generated in the detector as the length of the core and the distance between the detector and the source of energy is varied.

While various vehicles such as automobiles, tanks, armored units and other mobile devices are known to possess a multiplicity of magnetic poles, it can be generally said that while no two vehicles have the same external magnetic characteristics, a certain type vehicle will have characteristics and magnetic strength generally similar to other vehicles of the same type. In systems employing the magnetic detector as set forth herein, the system is generally arranged so that the detector in combination with other equipment will "pick up" the vehicle having the weakest magnetic strength effective to initiate operation of the system in whatever form it may be.

In order to determine the results as presented in the present application, a consistent field strength has been utilized as presented in Figs. 1, 2 and 3 by energizing a coil 41 with 115 volts of alternating current having a frequency of 60 cycles.

In Figs. 1, 2 and 3 the coil 41 having a substantially constant field strength is representative of a unit of traffic. In Fig. 1 the detector 42 having a core 43 with laminations 44 and 45 being contiguous and overlapping within the confines of the core. A voltmeter 46 is serially connected to the winding of the detector 42, by conductors 47 and 48. With the distance shown as 18", the voltage generated in the detector 42 was measured. The voltages in the detector 42 were measured with varying overall lengths of the core 43.

In Fig. 2 the same equipment was used but the spacing between the coil 41 and the detector 42 was reduced to 12" and the tests again repeated in the same manner and those carried out for the disclosure in Fig. 1.

Fig. 3 shows a representation where the distance between the coil 41 and the detector 42 was reduced to 6" and the tests again repeated.

In all of the tests the measurement between the coil 41 and the detector 42 was from the axial center of the coil 41 to the axial center of the detector 42. The distances of 6", 12" and 18" for the respective views shown in Figs. 3, 2 and 1 respectively are distances from the axial center of the coil 41 to the axial center of detector 42 in each instance. The results of the tests were all plotted on a chart as shown in Fig. 6.

From observing the chart it will be seen that the curves D—18, D—12 and D—6 were all made with cores ranging from 8" in length to 24" in length, and in each instance laminated cores were used as well as a single core for each of the tests.

By observing the chart in Fig. 6, it will be seen that as the core length was increased from the minimum of 8" to the maximum of 24", the greatest voltage induced in the detector was attained with a core of approximately 20" in length. After the core length was extended beyond the 20" length, the efficiency decreased. Cores over 24" in length were not used as it was obvious that the efficiency decreased approximately the same amount as increased.

Curve D—18 being farthest away from the coil 41, had only approximately an increase in 12 volts from the 8" core to the maximum efficiency of the 20" core. The increase in voltage generated in the detector when the distance of 12" is shown on the curve D—12 of about 14 volts when the core ranges from 8" to 20", while the D—6 curve shows a variation in generated voltage of about 54 volts.

The coil 41 and the coil of the detector 42 were varied in size throughout the various tests. Coils in both instances were varied from 3" to about 8" in length and the various length coils 41 were interchanged with various length coils of detector 42 over the same range of coil length.

In all of the tests there is a definite indication that the size of the coil used in ordinary detectors of the type set forth herein did not have any appreciable effect upon the results obtained concerning the core length, so that it might be generally set forth that the shape and size of the coil has no apparent effect on this phenomena.

It is evident from the graph that the square law holds true showing that as the distance is doubled you receive one-fourth of the voltage. For instance, if we use a core length of 20", we have a voltage of 85 volts when the detector is 6" from the source and we have a voltage of 21½ volts when the detector is 12" from the source.

As far as can be determined, the length of the coil has no bearing on the phenomenon of a definite maximum length of core as indicated in the graph as approximately 20".

Fig. 4 shows a core 49 composed of individual laminations 50 which may be extended as shown by the dotted lines at the ends of the core. This represents generally that the various laminations are placed in touching relation with each other and are overlapping so that while the core laminations themselves are separate, the effect is the same as though the core were a continuous piece of material. In normal operation the core laminations may be bound together by tape or may be held by any mechanical device which is convenient or suitable to be disposed within the coil of the detector.

Figure 5:
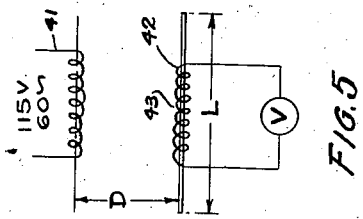
Fig. 5 is a schematic diagram of various coils electrically connected during the tests as shown in Figs. 1, 2 and 3.

In Fig. 5 a schematic representation of the coil 41 is shown with the detector 42 having the winding 43 thereon with the legend L as representative of the overall core length, while the legend D is representative of the distance between the centers of the coil 41 and the detector 42. Fig. 5 shows generally the circuit and the method of determining the results obtained, as shown by the three curves on the chart in Fig. 6.

From the foregoing it will be seen that a detector may be used to vary the efficiency of a control system, such as a traffic control, by varying the length of a detector, which may be assumed as the length of the coil of the detector, to a maximum of approximately 20". In operation, when used in a traffic signal, a core of a given length may be used to control a single lane of traffic which may be assumed as being approximately 9' wide, and a vehicle in an adjacent lane will not actuate the traffic signal responsive to said detector.

Since there are many variables in a system of this type it can be said generally that all magnetic detectors which depend on a core for suitable operation may have the core length limited to approximately 20" in length for maximum efficiency. By using a shorter core length the effective range will be decreased and this core length must be determined for the particular job at hand. If it is for traffic control, the core length may be set to operate over one, two or three lanes of traffic, but if it is for military use, the core length would be determined by the approximate distance the vehicle must be from the detector before a mine will explode, this distance being generally determined by a study of the largest tank or vehicle which is to be demolished or immobilized by the discharge of the mine.

What I claim as new and desire to secure by Letters Patent of the United States is:

1. A method of determining the desired effective range of a magnetic detector by disposing a source of magnetic energy at a given distance from the coil of a magnetic detector, inserting overlapping laminations within the coil of the detector to form a core for said detector, and moving the overlapping core laminations inwardly or outwardly until the desired voltage is generated in the magnetic detector dependent upon the overall length of the core, and securely binding the laminations together within the core, whereby the desired effective range of the detector is known.

2. A method of determining the desired effective range of a magnetic detector by disposing a source of magnetic energy at a given distance from the coil of a magnetic detector, inserting overlapping laminations within the coil of the detector to form a core for said detector, and moving the core laminations inwardly or outwardly until the desired voltage is generated in the magnetic detector dependent upon the overall length of the core, securely binding the laminations together within the core, and securely positioning the core at approximately the center of the magnetic detector coil to hold said core in fixed relation to the detector coil, to the end that the desired effective range of the detector is known.

3. A method of determining the desired effective range of a magnetic detector by disposing a coil at a given distance from the coil of a magnetic detector, energizing said first coil with alternating current, inserting overlapping laminations within the coil of the detector to form a substantially unitary core for said detector, and moving the core inwardly or outwardly until the desired voltage is generated in the magnetic detector dependent upon the length of the core, and securing the laminations together within the core to maintain the desired generated voltage, whereby the effective range of the magnetic detector is known.

4. A method of determining the desired effective range of a magnetic detector by disposing a coil at a given distance from the coil of a magnetic detector, energizing said first coil with a source of alternating current, inserting overlapping laminations within the coil of the detector to form a core for said detector, and moving the core inwardly or outwardly until the desired voltage is generated in the magnetic detector dependent upon the length of the core, securely binding the laminations together within the core, and securely positioning the core at approximately the center of the magnetic detector coil to maintain the desired generated voltage to the end that the effective range of the magnetic detector is known.

PAUL P. HORNI.